Feb. 14, 1939. L. M. PAYNE 2,146,845
VEHICLE VENTILATING AND HEATING STRUCTURE
Filed Nov. 15, 1937 2 Sheets-Sheet 1
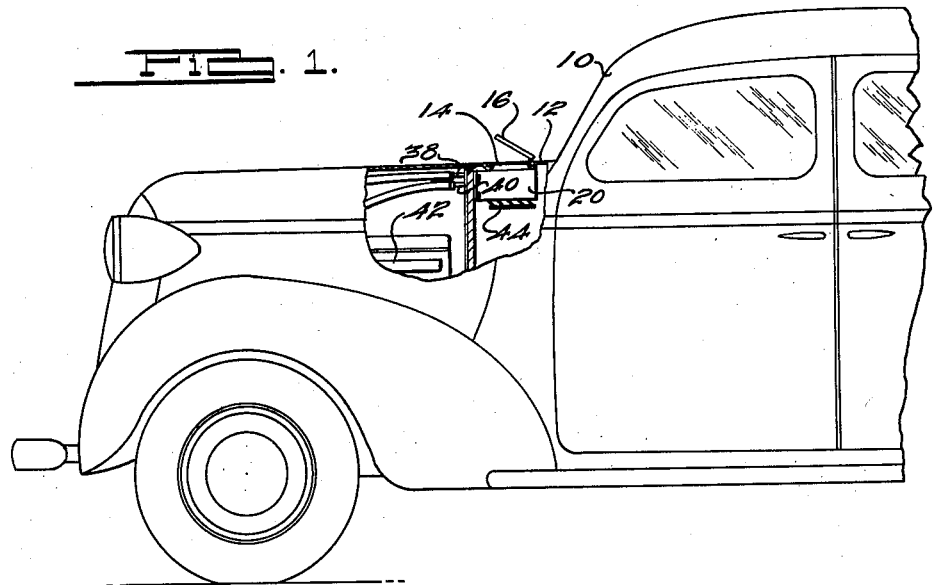
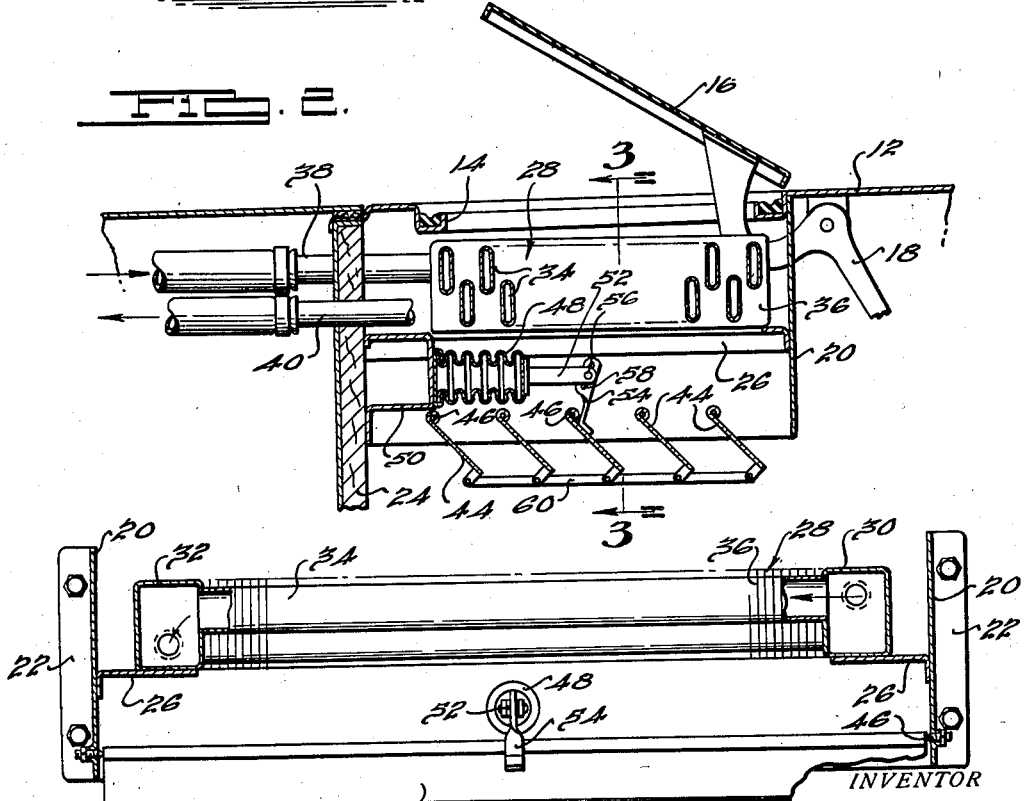
INVENTOR
Lambert M. Payne.
BY Harness, Dickey & Pierce.
ATTORNEYS.

Feb. 14, 1939.  L. M. PAYNE  2,146,845
VEHICLE VENTILATING AND HEATING STRUCTURE
Filed Nov. 15, 1937  2 Sheets-Sheet 2
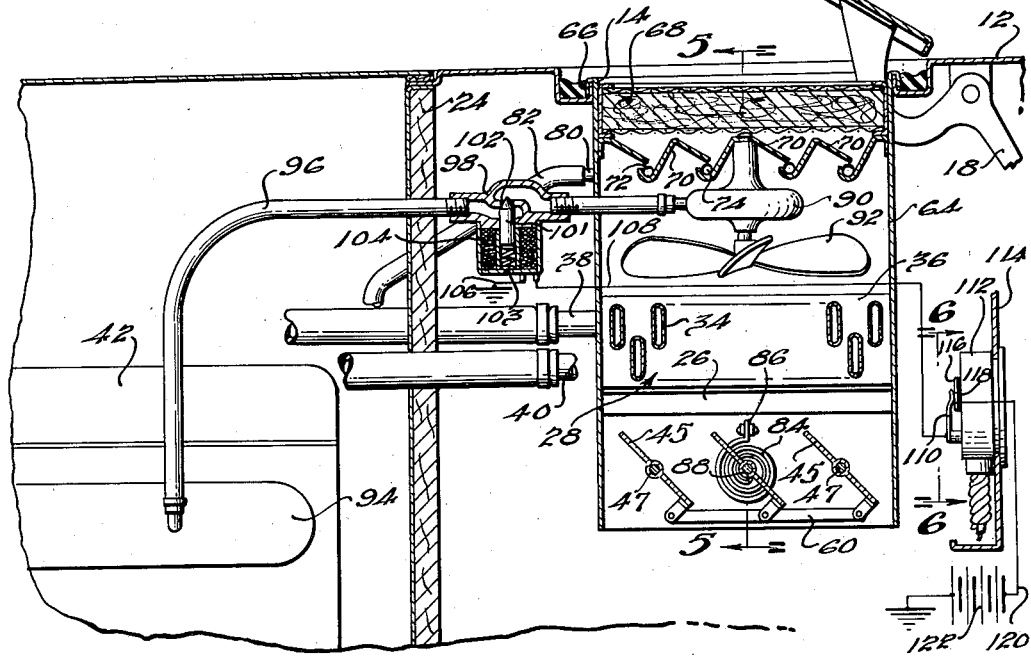
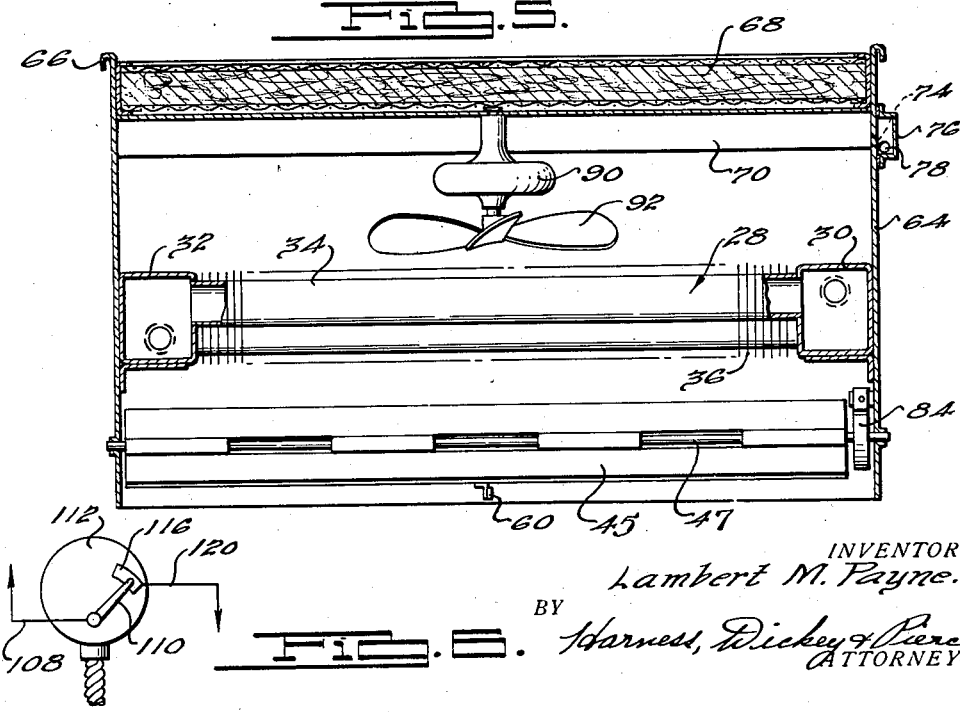
INVENTOR
Lambert M. Payne.
BY
Harness, Dickey & Pierce
ATTORNEYS.

Patented Feb. 14, 1939

2,146,845

UNITED STATES PATENT OFFICE 2,146,845

VEHICLE VENTILATING AND HEATING STRUCTURE

Lambert M. Payne, Detroit, Mich.

Application November 15, 1937, Serial No. 174,629

5 Claims. (Cl. 98—2)

The present invention relates to structures for ventilating and heating the interior of an automotive vehicle; and particularly relates to structures whereby fresh outside air is injected into the passenger compartment of the vehicle in automatically controlled amounts.

One of the primary objects of the present invention is the provision of a heat exchanger, positioned in the path of air passed through the cowl opening of a vehicle, having thermostatically operated shutters associated therewith whereby the volume of air discharged into the passenger compartment is automatically controlled and varied according to the variations in the air temperature.

A further object of the present invention is to provide an improved arrangement of the automatically operated shutters so that the shutters may function independently of the positions of the cowl shutters.

A further object of the invention is the provision of a simplified all-weather ventilating structure whereby outside air may be introduced into the passenger compartment of the vehicle in a heated condition in inclement weather, and water is prevented from passing into the passenger compartment along with the heated air.

A further object of the present invention is the provision of a heat exchanger, positioned in the path of air passed through the cowl opening of a vehicle, having a fan associated therewith for forcing the air into the passenger compartment of the vehicle in which the fan is automatically operated in accordance with predetermined vehicle speeds.

A further object of the present invention is to provide a simplified structure which may be readily installed in an automotive vehicle with a minimum of alteration necessary to adapt the vehicle structure for its installation.

Other objects of the invention will become apparent from the following specification, the drawings relating thereto, and from the claims hereinafter set forth.

In the drawings in which like numerals are used to designate like parts in the several views throughout:

Figure 1 is a fragmentary side elevational view of a vehicle, with parts broken away, illustrating an embodiment of the present invention;

Fig. 2 is an enlarged, fragmentary vertical cross-sectional view of the ventilating and heating structure illustrated in Fig. 1;

Fig. 3 is a cross-sectional view taken substantially along the line 3—3 of Fig. 2;

Fig. 4 is a view similar to Fig. 2 illustrating a modified embodiment of the present invention;

Fig. 5 is a cross-sectional view taken substantially along the line 5—5 of Fig. 4; and Fig. 6 is a fragmentary rear elevational view taken along the lines 6—6 of Fig. 4.

According to the present invention a structure is provided which includes a hot water heat exchanger connected to the water cooling system of the engine, which is disposed within a conduit below the usual cowl ventilating opening of an automotive vehicle. The cowl opening is provided with the usual adjustable closure for controlling the amount of air passed through the cowl opening upon forward movement of the vehicle. Control shutters are disposed adjacent the outlet of the conduit and have operatively associated therewith a thermostatic means which controls the opening and closing of the shutters upon variations in the temperature of the air passed through the heat exchanger. The shutters are disposed at the outlet side of the heat exchanger, so that the positions of the shutters are varied independently of the positions of the cowl ventilator closure.

Also according to one embodiment of the present invention, a fan is disposed in the conduit for drawing air from the outside and forcing the air through the heat exchanger into the passenger compartment of the vehicle. Automatic means are provided for actuating the fan at predetermined vehicle speeds, and particularly at low speeds of the vehicle. As the vehicle moves forward at relatively high speeds, there is ordinarily no need for the fan, as the forward movement of the vehicle causes passage of sufficient air through the cowl opening into the passenger compartment. At relatively low speeds, however, the forward movement of the vehicle may not supply sufficient air for proper ventilation of the passenger compartment; and the fan with its automatic actuating means functions at the low speed to force a sufficient volume of air into the passenger compartment for its proper ventilation.

Also, in order that extraneous foreign material, such as dirt or water, is not discharged into the passenger compartment, a screen filter and drain structure are provided. Clean and fresh outside air is thus provided for ventilating the passenger compartment.

Referring to the drawings, and referring particularly to Figs. 1 to 3, an automotive vehicle 10 of the passenger type is illustrated having the usual cowl 12 with the usual cowl opening 14 therethrough. A conventional cowl closure member 16 having the usual operating arm 18 is provided for controlling the volume of fresh outside air passed through the ventilating opening 14 upon forward movement of the vehicle 10. A substantially U-shaped member 20 having outwardly directed flanges 22 is disposed immediately beneath the cowl opening 14 and is secured through the flanges 22 to the dashboard 24 of the vehicle to provide an air inlet conduit which communicates with the passenger compartment of the vehicle. A supporting bracket member 26, preferably of angle section, is mounted within the conduit member 20 and secured thereto in any suitable manner, as by spot welding for example, to provide a support upon which a heat exchanger generally indicated at 28 is mounted.

The heat exchanger 28 is preferably of the size and shape of the cowl opening 14, and may be of any suitable construction; but in the embodiment illustrated the heat exchanger 28 is shown as of the tube and fin type. The heat exchanger 28 includes side headers 30 and 32 which are connected together by a plurality of flattened tubes 34. Fin members 36 are disposed over the tubes 34 and increase the heat exchange in the usual way. A hot water inlet tube 38 communicates with the side header 30; and an outlet tube 40 communicates with the side header 32 for supplying the circulating heating medium to the heat exchanger 28. The inlet tube 38 and outlet tube 40 extend through openings in the dash and are connected to the water cooling system of the engine 42 of the vehicle in the usual way.

In order to automatically control the volume of air discharged into the passenger compartment a plurality of shutter members 44 are disposed across the conduit 20 adjacent the outlet end thereof in substantially parallel relation to each other. The shutter members 44 may be pivotally mounted upon pivot rods 46 along one edge of the members 44 and the rods 46 may be suitably secured to the side walls of the members 20. A bellows type thermostatic means 48 is disposed within the conduit 20 between the shutters 44 and the discharge side of the heat exchanger 28, and may be mounted on a supporting member 50 which is mounted within the conduit 20 and which may be suitably secured to the dash 24. A projecting arm member 52 is fixed to the free end of the bellows 48 and is pivotally connected to an arm member 54 by means of a pin 56 which is disposed within an elongated slot 58 of the arm member 54. The arm member 54 is connected to one of the shutters 44; and all of the shutters 44 are connected together adjacent their lower edges by means of an elongated member 60 which is pivotally connected to each of the shutter members 44. One of the shutter members 44 is thus actuated by the arm 52 through its loose pivotal connection with the arm member 54, and all of the shutter members 44 move together by the pivotal connection of the members 60.

In operation, heat is supplied to the heat exchanger 28 by the water cooling system of the engine through the inlet and outlet tubes 38 and 40; and by suitably adjusting the cowl closure 16, fresh outside air is caused to pass through the ventilating opening 14 and through the heat exchanger 28 within the conduit 20. The air is heated as it passes through the heat exchanger 28; and the heated air passes over the bellows 48 in heat exchange relationship therewith. According to the temperature of the heated air, the bellows 48 is caused to expand or contract; and as the bellows expands or contracts, the shutters 44 are proportionately opened or closed. The passenger compartment of the vehicle may be maintained at a predetermined and proper constant temperature.

Referring to Figs. 4 to 6, another embodiment of the present invention is illustrated in which a conduit member 64 of substantially the cross-sectional shape of the inner peripheral edges of the ventilating opening 14 is provided for providing an enclosing air inlet conduit communicating with the passenger compartment of the vehicle. The member 64 is reversely bent at 66 adjacent its upper edge to provide channels around its upper edge which are adapted to receive therein the inner peripheral edges of the members forming the cowl opening 14 for suspending or mounting the conduit member 64 to the cowl. An air filter member 68 which is of fibrous material, such as rock wool, is disposed within the conduit 64 adjacent the inlet end thereof for removing foreign material such as dust or dirt from the air as it passes through the ventilating opening.

Angle baffle members 70 are disposed across the conduit 64 and have their bottoms shaped to form troughs 72 for the purpose of collecting water or moisture and preventing the passage of the water or moisture into the passenger compartment. The baffles are so arranged relative to each other that adjacent ends of the baffles overlap and lie above the troughs 72, so that any moisture or water is directed into the troughs. Drain openings 74 are provided through one end wall of the conduit member 64 adjacent each trough 72 so that the water collected in the troughs may be discharged from the conduit. A substantially U-shaped member 76 is mounted on the outside wall of the conduit member 64 in overlying relation to the openings 74 for collecting the water and forming a drain conduit for carrying the water through an opening 78 in one end of the conduit member. A tubular member 80 is associated with the opening 78 and has associated therewith an elongated flexible tubular member 82 which may extend through the dash 24 and be carried to a suitable position for discharging the water collected in the conduit 76. The water collected in the troughs 72 is thus drained away and discharged so that the fresh heated air discharged in the passenger compartment does not contain such water or moisture.

The conduit member 64 is of greater length than the conduit member 20 previously described; and the water heat exchanger 28 is disposed within the conduit member 64 in downwardly spaced relation to the inlet ventilating opening 14. The shutter members 45 are disposed adjacent the outlet of the water heat exchanger and adjacent the outlet of the conduit 64 for controlling the volume of air discharged from the conduit 64. In the embodiment illustrated in Figs. 4 to 6, the shutter members 45 are pivoted about pivot rods 47 at substantially the transverse centers of the shutter members 45. The pivot rods 47 may be suitably mounted to opposite end walls of the conduit members 64. A bi-metallic spiral thermostatic element 84 is mounted within the conduit 64 and has one end 86 secured thereto and its other end 88 secured to one of the shutters 45. Upon expansion of the bi-metallic element 84, the shutters 45 are thus caused to open and upon contraction of the element 84, the shutter members 45 are caused to close.

At relatively high vehicle speeds, the forward movement of the vehicle causes sufficient air to pass into the ventilating opening 14 so that an adequate supply of fresh outside air is supplied in the passenger compartment. At relatively low speeds, however, sufficient air may not be provided; and in order to supply a sufficient volume of air, particularly at the low speeds, a fan 90 having propeller fan elements 92 associated therewith is mounted within the conduit 64 to one of the baffle members 70 above the inlet side of the exchanger 28. The fan 90 is motor driven and is preferably of the vacuum motor type. The vacuum motor is connected to the intake manifold 94 of the engine 42 by means of a conduit 96.

For automatically controlling the actuation of the vacuum motor at predetermined speeds, a magnetic needle valve 98 is interposed in the vacuum conduit 96. The valve 98 includes a metal needle 101 which seats within the usual valve opening 102 of the valve. The needle 101 is normally urged upwardly to its closed position by means of a spiral spring 103. A solenoid 104 is disposed in surrounding relation to the needle 101; and the electric circuit for the solenoid 104 includes a lead wire 106 which may be grounded to the vehicle and a lead wire 108 which is connected to a pivotal switch arm 110. The switch arm 110 is fixedly mounted to the speedometer shaft of a speedometer 112 which is mounted to the instrument panel 114 in the usual way. A switch element 116 in the form of a segment of predetermined length is mounted to the rear face of the speedometer 112 and is electrically insulated therefrom by means of insulation 118. The segment 116 may be of a length corresponding to selected predetermined and desired vehicle speeds. Thus, for example, the segment 116 may be of a length such as the length represented by the speeds from zero to fifteen miles per hour on the speedometer 112. As the vehicle speed varies, and as the speedometer shaft is thus turned, the arm 110 is turned with the shaft and engages the switch element 116 for speeds corresponding to the speeds represented by the length of the element 116. As the vehicle exceeds the upper predetermined speed, the arm 110 is disengaged from contact with the element 116 and the circuit is broken. The circuit is completed by a lead wire 120 which is electrically connected to the element 116 and which is connected to a battery 122 and then grounded to complete the circuit. When the arm 110 is in engagement with the element 116, the circuit is completed; and the solenoid is energized. This causes withdrawal of the needle from the valve opening 102 and communicates the vacuum motor with the intake manifold thus operating the fan.

Formal changes may be made in the specific embodiment of the invention described without departing from the spirit and substance of the present invention, the scope of which is commensurate with the appended claims.

What is claimed is:

1. Vehicle ventilating and heating apparatus comprising an automotive vehicle having a passenger compartment, means forming a ventilating opening in said vehicle communicating with the outside, adjustable closure means controlling the flow of air through said opening, means forming an air confining conduit communicating with said opening and with the passenger compartment, a heat exchanger positioned in said conduit in the path of air passing therethrough, shutter means associated with said conduit and positioned adjacent the discharge side of said heat exchanger for controlling the flow of air through said conduit, and thermostatically actuated means interposed between the discharge side of said heat exchanger and said shutter means and operatively connected to said shutter means for controlling the positions of said shutter means in accordance with variations in the temperature of the air passing through said conduit.

2. Vehicle ventilating and heating apparatus comprising an automotive vehicle having a passenger compartment, means forming a ventilating opening in said vehicle communicating with the outside, adjustable closure means controlling the flow of air through said opening, means forming an air confining conduit communicating with said opening and with the passenger compartment, a heat exchanger positioned in said conduit in the path of air passing therethrough, shutter means associated with said conduit and positioned adjacent the discharge opening of said conduit for controlling the flow of air therethrough, and thermostatically actuated means interposed between the discharge side of said heat exchanger and said shutter means and operatively connected to said shutter means for controlling the position of said shutter means in accordance with variations in the temperature of the air passing through said conduit.

3. Vehicle ventilating and heating apparatus comprising an automotive vehicle having a cowl and a passenger compartment, means forming a ventilating opening in said cowl, adjustable closure means controlling the flow of air through said opening, means forming an air confining conduit communicating with said opening and with the passenger compartment, a heat exchanger positioned in said conduit in the path of air passing therethrough, a shutter means associated with said conduit and positioned adjacent the discharge side of said heat exchanger for controlling the flow of air through said conduit, and thermostatically actuated means interposed between the discharge side of said heat exchanger and said shutter means and operatively connected to said shutter means for controlling the positions of said shutter means in accordance with variations in the temperature of the air passing through said conduit.

4. Vehicle ventilating and heating apparatus comprising a vehicle having a cowl and a passenger compartment, means forming a downwardly directed ventilating opening in said cowl communicating with the outside, adjustable closure means controlling the flow of air through said opening, means forming an air confining conduit communicating with said opening and with the passenger compartment, baffles mounted within said conduit adjacent said ventilating opening, said baffles being shaped to provide troughs at the bottom thereof, a heat exchanger positioned in said conduit beneath said baffles in the path of air passing through said conduit, shutter means associated with said conduit and positioned adjacent the discharge side of said heat exchanger for controlling the flow of air through said conduit, and thermostatically actuated means interposed between the discharge side of said heat exchanger and said shutter means and operatively connected to said shutter means for controlling the positions of said shutter means in accordance with variations in the temperature of the air passing through said conduit.

5. Vehicle ventilating and heating apparatus comprising an automotive vehicle having a cowl and a passenger compartment, means forming a ventilating opening in said cowl communicating with the outside, adjustable closure means controlling the flow of air through said ventilating opening, means forming an air confining conduit communicating with said opening and with the passenger compartment, a fan mounted within said conduit for forcing the air therethrough, means for driving said fan, a heat exchanger positioned within said conduit in the path of air passing therethrough, shutter means associated with said conduit and positioned adjacent the discharge side of said heat exchanger for controlling the flow of air through said conduit, and thermostatically actuated means interposed between the discharge side of said heat exchanger and said shutter means and operatively connected to said shutter means for controlling the positions of said shutter means in accordance with variations in the temperature of the air passing through said conduit.

LAMBERT M. PAYNE.